(No Model.)
G. W. WILLIAMS.
SPRING FOR PISTON HEADS.
No. 291,009. Patented Dec. 25, 1883.
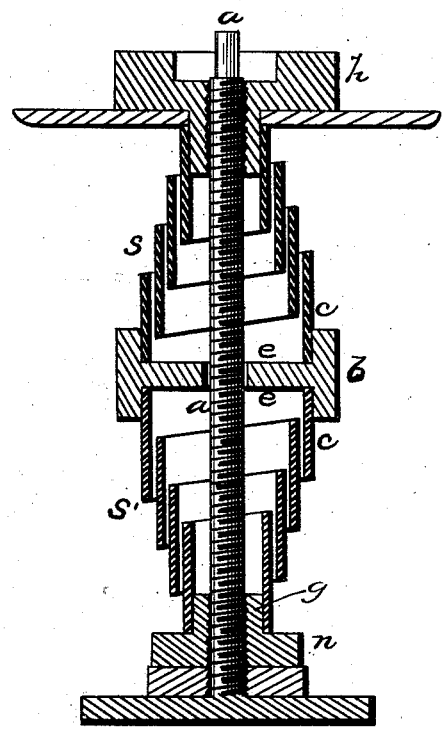
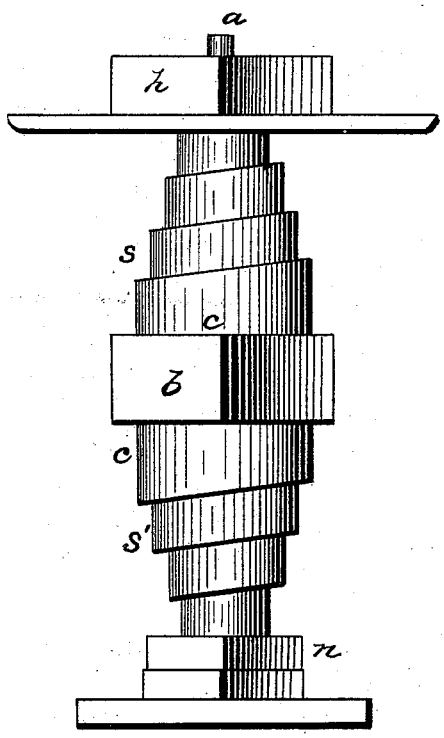
WITNESSES
E. H. Bates,
Philip Mauasi.
INVENTOR
Geo. W. Williams
by Anderson & Smith
his ATTORNEYS

UNITED STATES PATENT OFFICE.

GEORGE W. WILLIAMS, OF WINONA, MINNESOTA.

SPRING FOR PISTON-HEADS.

SPECIFICATION forming part of Letters Patent No. 291,009, dated December 25, 1883.

Application filed March 29, 1883. (No model.)

*To all whom it may concern:*

Be it known that I, GEORGE W. WILLIAMS, a citizen of the United States, residing at Winona, in the county of Winona and State of Minnesota, have invented certain new and useful Improvements in Springs for Piston-Heads; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view, and Fig. 2 is a side view.

This invention has relation to expanding devices for piston-packings; and it consists in the construction and novel arrangement of two spiral volute springs, having their bases toward each other, and, in engagement with a central bearing, a bolt-connection or guide-rod extending through said springs and bearing, and a setting-up nut engaging the guide bolt or rod, all as hereinafter set forth.

In the accompanying drawings, the letter *a* designates a threaded bolt or guide-rod, and *b* a bearing-plate arranged thereon at about its middle portion. The bearing-plate *b* engages the larger ends or bases *c* of two spiral volute springs, *s s'*, which extend around the guide-rod from the bearing-plate *b* toward the ends of said rod. The plate *b* is usually provided with recesses *e*, in which the bases of the springs are seated and which serve to prevent the expansion of the springs at their larger ends. Near the inner end of the guide-rod *a* is placed a setting-up nut, *n*, which is usually formed with a guide-bearing, *g*, to engage the small end or apex of the inner spiral volute spring, *s'*, and hold it in position on the guide-rod. On the outer portion of the guide-rod a holding-nut, *h*, also provided with a guide-bearing, is located in engagement with the small end or apex of the outer spiral volute spring, *s*, and adapted to engage the threaded portion of the guide-rod *a*, to serve in holding the springs in contracted position, so that they may be easily applied in position between the packing and the central bearing or spider of the piston. When the expander is in position, the holding-nut is turned out of engagement with the threaded portion of the guide-rod, so that the full form of the springs can be exerted against the packing. By means of the setting-up nut *n*, the pressure of the springs can be increased or diminished according to requirement.

Having described this invention, what I claim, and desire to secure by Letters Patent, is—

In a piston-packing expander, the combination, with the spiral volute springs *s s'*, and the central bearing-plate, *b*, engaging directly with the bases of the same, of the central guide-rod threaded nearly its entire length, the holding-nut *h*, and setting-up nut *n*, both provided with guide-bearings adapted to engage the outer or smaller ends of the said springs, substantially as and for the purposes specified.

In testimony whereof I affix my signature in presence of two witnesses.

GEO. W. WILLIAMS.

Witnesses:
H. G. SMITH,
D. E. VANCE.